(12) United States Patent
Jinn et al.

(10) Patent No.: US 8,743,476 B2
(45) Date of Patent: Jun. 3, 2014

(54) LENS WITH SINGLE DETECTION MEMBER SHARED TO PERFORM FOCUSING AND ZOOMING OPERATIONS AND RESET METHOD THEREOF

(75) Inventors: Yu-Shuh Jinn, Taichung (TW); Tsungli Chen, Taichung (TW)

(73) Assignee: Asia Optical Co. Inc., Taichung (TW)

( * ) Notice: Subject to any disclaimer, the term of this patent is extended or adjusted under 35 U.S.C. 154(b) by 24 days.

(21) Appl. No.: 13/541,781

(22) Filed: Jul. 5, 2012

(65) Prior Publication Data

US 2013/0176630 A1 Jul. 11, 2013

(30) Foreign Application Priority Data

Jul. 6, 2011 (TW) .............................. 100123883 A

(51) Int. Cl.
*G02B 15/14* (2006.01)
(52) U.S. Cl.
USPC ............................ 359/700; 359/823; 396/80
(58) Field of Classification Search
USPC .................... 359/694–706, 821–826; 396/80; 348/240.99
See application file for complete search history.

(56) References Cited

U.S. PATENT DOCUMENTS 5,708,870 A * 1/1998 Sugita et al. .................... 396/87
7,551,376 B2 * 6/2009 Koyama ......................... 359/823

FOREIGN PATENT DOCUMENTS

TW 305603 11/2007
TW 310848 2/2008

* cited by examiner

*Primary Examiner* — Darryl J Collins
*Assistant Examiner* — Gary O'Neill

(57) ABSTRACT

A lens with a single detection member shared to perform focusing and zooming operations includes a base, a detection member, a focusing unit and a zooming unit. The focusing unit includes a focusing group frame and a focusing detection board. The zooming unit includes a zooming group frame and a zooming detection board. In a reset method, a signal read from the detection member is a light-passing signal or a light-shielding signal, the focusing group frame and the zooming group frame are in any position. With the focusing group frame of the focusing unit and the zooming group frame of the zooming unit, the any position of the focusing group frame and the zooming group frame can be determined, and then the focusing group frame and the zooming group frame are driven to reset as a predetermined standby position.

8 Claims, 8 Drawing Sheets

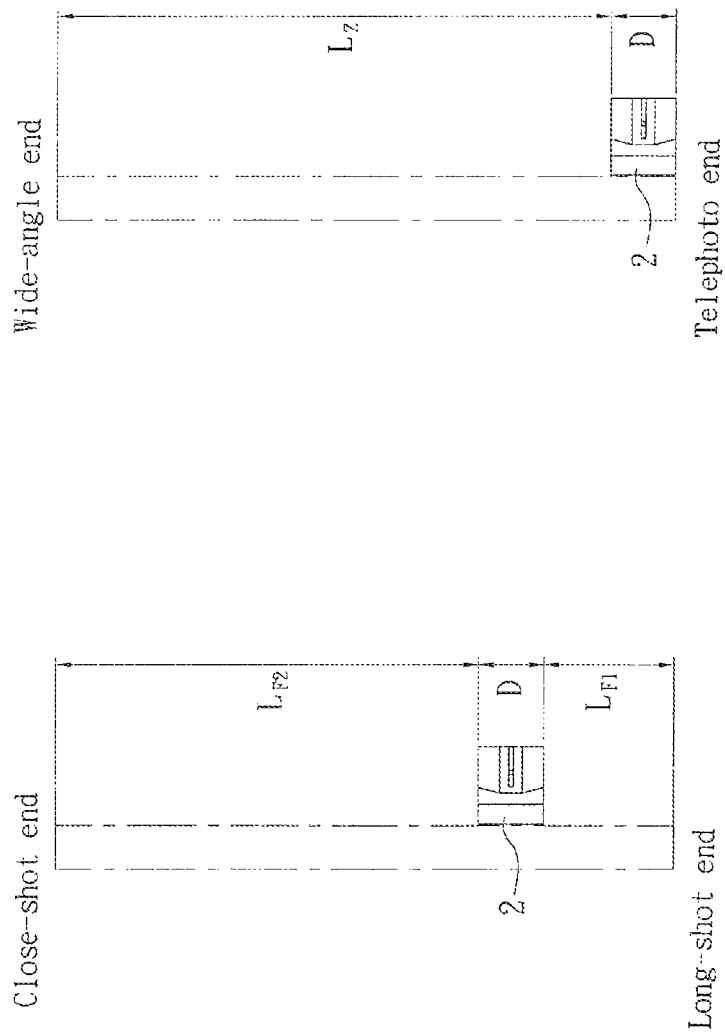

LENS WITH SINGLE DETECTION MEMBER SHARED TO PERFORM FOCUSING AND ZOOMING OPERATIONS AND RESET METHOD THEREOF

BACKGROUND OF THE INVENTION

1. Field of the Invention

The invention relates to a lens and a reset method thereof, in particular relates to a lens with a single detection member shared to perform focusing and zooming operations and a reset method thereof.

2. Description of the Related Art

In the past, a lens generally includes a focusing unit and a zooming unit. The focusing unit includes a focusing group frame and a focusing driving member utilized to drive the focusing group frame to move between a long-shot end and a close-shot end. The zooming unit includes a zooming group frame and a zooming driving member utilized to drive the zooming group frame to move between a wide-angle end and a telephoto end. Formally, each of the focusing unit and the zooming unit is individually provided with a detection member which is utilized to detect zero return positions of the focusing group frame and the zooming group frame. For example, Taiwan Patent Nos. I310848 and I305603 respectively disclose detection members which are respectively corresponding to the focusing unit and the zooming unit, in which the detection principle of the zooming unit relates to a cam cylinder provided with a reflecting plate, and the detection members disposed on a fixed cylinder are utilized to detect whether the position of the reflecting plate is correct or not.

However, the total cost of the lense unit is majorly decided by the amount of the detection members. If a single detection member can be shared to perform focusing and zooming operations, the total cost of the lense unit can be reduced. Therefore, one of the goals for the related manufacturers is to study and develop a lens and a reset method for the single detection member capable of controlling the positions of the focusing group frame and the zooming group frame and reducing the manufacturing cost.

BRIEF SUMMARY OF THE INVENTION

In view of this, the purpose of the invention is to provide a lens and a reset method thereof with a single detection member shared to perform focusing and zooming operations, capable of controlling the positions of a focusing group frame and a zooming group frame and reducing the manufacturing cost.

Accordingly, the invention provides a lens with a single detection member shared to perform focusing and zooming operations. The lens includes a base, a detection member, a focusing unit and a zooming unit. The detection member is installed on the base. The focusing unit includes a focusing group frame slidably installed on the base, a focusing detection board formed on the focusing group frame and corresponding to the detection member, and a focusing driving member installed on the base and utilized to drive the focusing group frame to move between a long-shot end and a close-shot end. The zooming unit includes a zooming group frame slidably installed on the base and located above the focusing group frame of the focusing unit, a zooming detection board formed on the zooming group frame and corresponding to the detection member, and a zooming driving member installed on the base and utilized to drive the zooming group frame to move between a wide-angle end and a telephoto end.

Further, the invention provides a reset method for the above-described lens with the single detection member shared to perform focusing and zooming operations. The reset method includes the following steps. Firstly, in an execution of a step 'A', a signal is read from the detection member to determine whether the signal represents a light-passing signal or a light-shielding signal when the focusing group frame of the focusing unit and the zooming group frame of the zooming unit are in an any position. The focusing detection board of the focusing unit is located at the detection member and the zooming detection board of the zooming unit is located above the focusing detection board of the focusing unit when the focusing group frame of the focusing unit and the zooming group frame of the zooming unit are in a first position where the signal of the detection member represents the light-shielding signal; the zooming detection board of the zooming unit is located at the detection member and the focusing detection board of the focusing unit is located below the zooming detection board of the zooming unit when the focusing group frame of the focusing unit and the zooming group frame of the zooming unit are in a second position where the signal of the detection member represents the light-shielding signal; the focusing detection board of the focusing unit is located below the detection member and the zooming detection board of the zooming unit is located above the detection member when the focusing group frame of the focusing unit and the zooming group frame of the zooming unit are in a third position where the signal of the detection member represents the light-passing signal; and the focusing detection board of the focusing unit and the zooming detection board of the zooming unit are located above the detection member when the focusing group frame of the focusing unit and the zooming group frame of the zooming unit are in a fourth position where the signal of the detection member represents the light-passing signal. Next, in an execution of a step 'B', the any position of the focusing group frame of the focusing unit and the zooming group frame of the zooming unit is determined from the first position, the second position, the third position or the fourth position. In an execution of a step 'C' after the step 'B', the focusing group frame and the zooming group frame driven by the focusing driving member and the zooming driving member is reset as a predetermined standby position.

The efficacy of the invention lies in the focusing unit provided with the focusing detection board and the zooming unit provided with the zooming detection board, which are based on the arrangement of the single detection member. With the above-described steps, the position determination and the reset as the predetermined standby position for the focusing group frame and the zooming group frame can be achieved, thereby certainly controlling the positions of the focusing group frame and the zooming group frame and reducing the manufacturing cost.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 8 is a schematic view illustrating, in the first preferred embodiment, a range of the detection member, a range of the focusing group frame which is measured from a close-shot end to the detection member, and a range of the focusing group frame which is measured from a long-shot end to the detection member;

FIG. 9 is a schematic view illustrating, in the first preferred embodiment, a range of the detection member and a range of the zooming group frame which is measured from a telephoto end to the detection member;

DETAILED DESCRIPTION OF THE INVENTION

Before describing the invention in detail, it is announced that similar elements are generally denoted by same reference number hereinafter.

Figure 1:
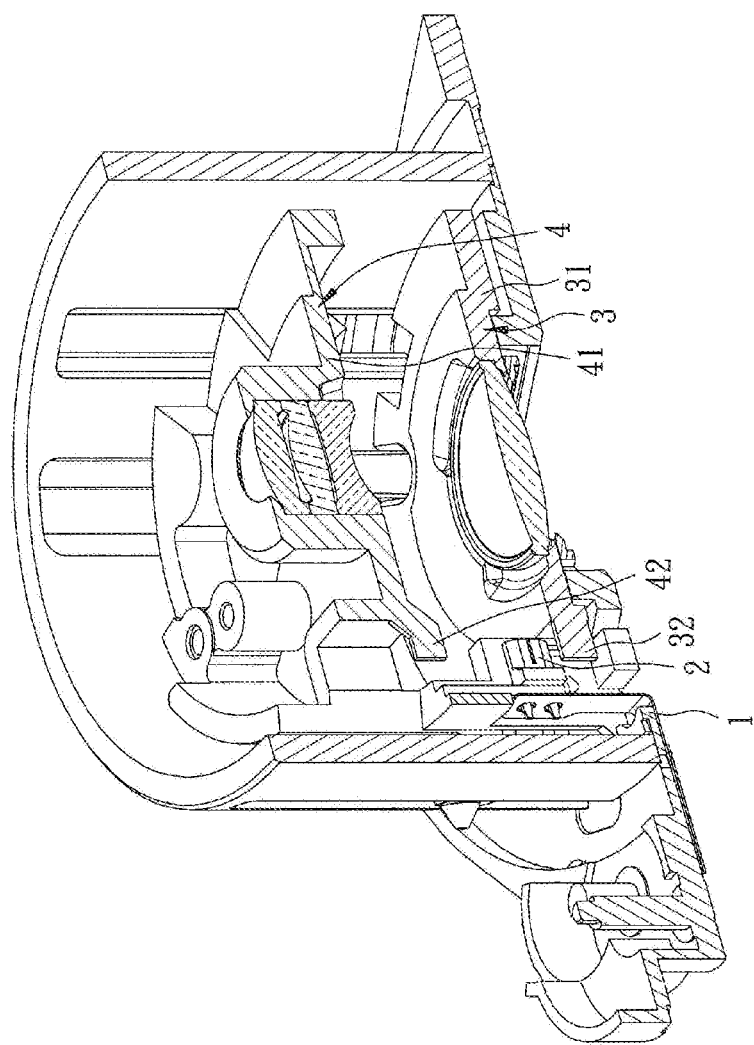
FIG. 1 is a perspective sectional view illustrating a first preferred embodiment of a lens with a single detection member shared to perform focusing and zooming operations in the invention.
Figure 2:
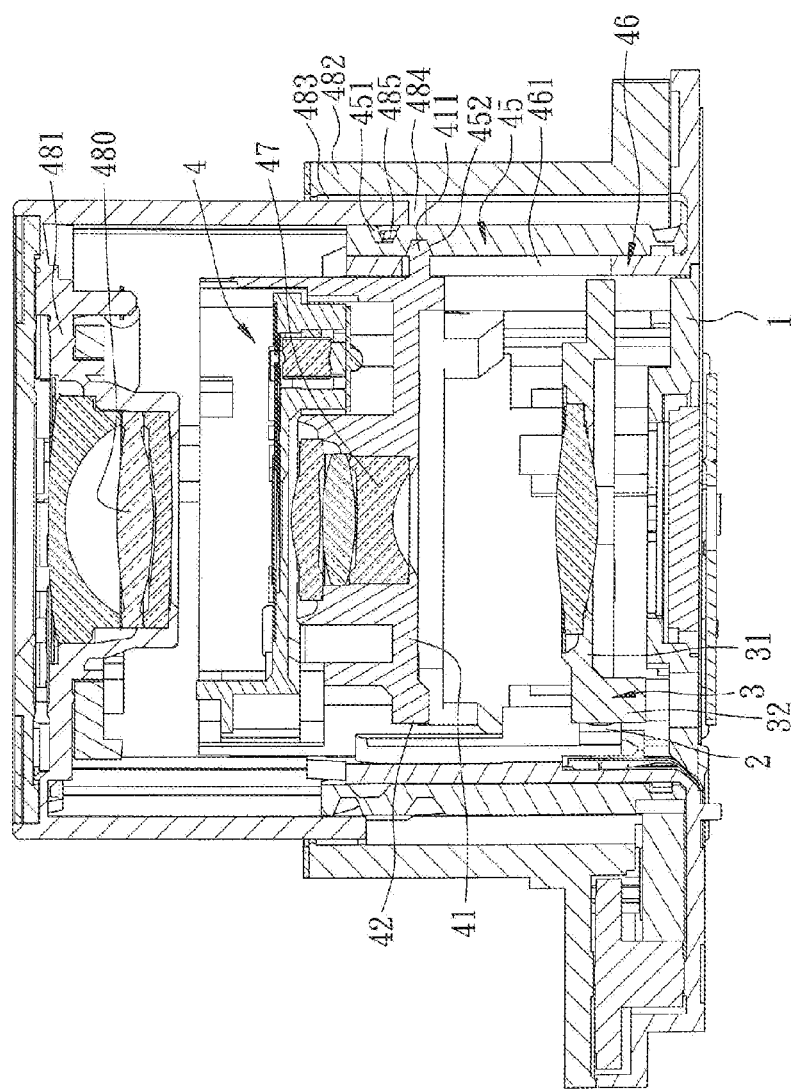
FIG. 2 is a sectional view illustrating a base, a detection member, a focusing unit and a zooming unit of the first preferred embodiment.
Figure 3:
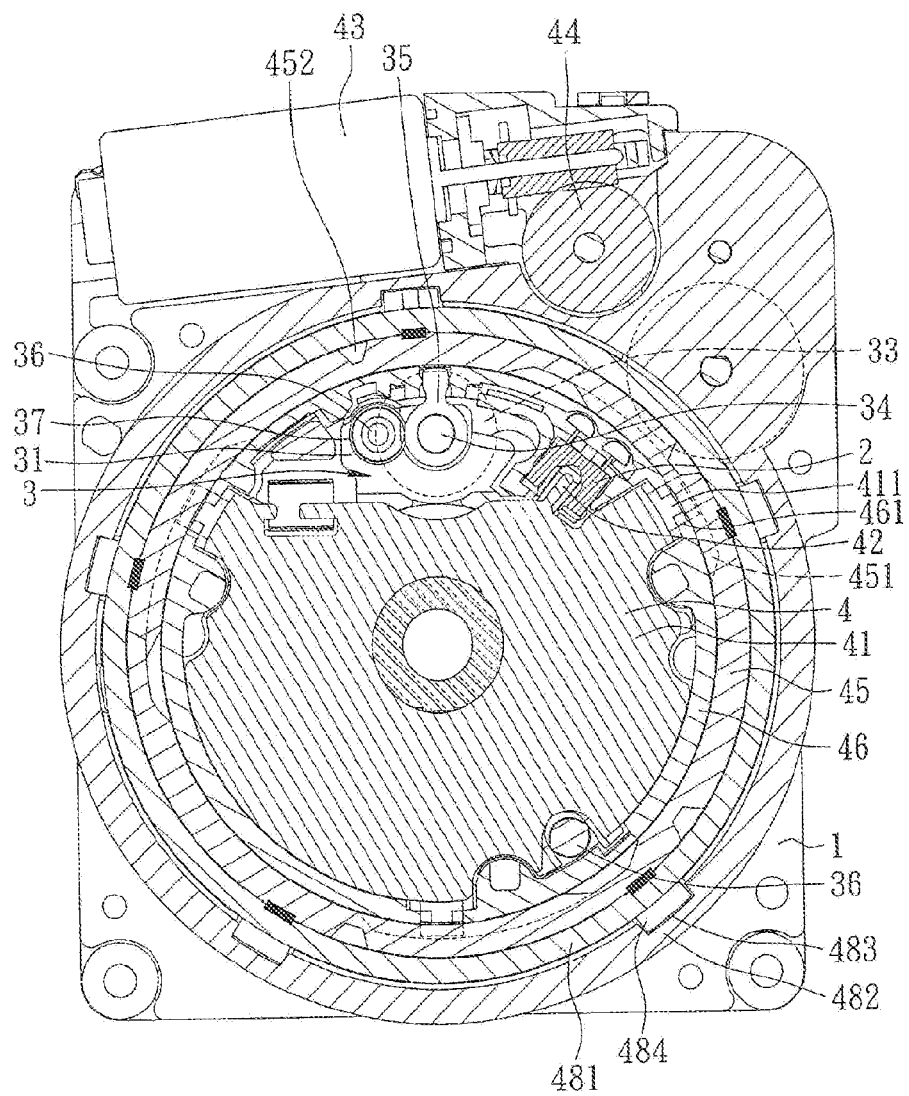
FIG. 3 is a top view illustrating a focusing driving member and a zooming driving member of the first preferred embodiment.

Referring to FIGS. 1, 2 and 3, a first preferred embodiment of a lens with a single detection member 2 shared to perform focusing and zooming operations and a reset method of the invention is illustrated. The lens includes a base 1, a detection member 2, a focusing unit 3 and a zooming unit 4.

The detection member 2 is installed on the base 1. In the first preferred embodiment, an optical transmission detection member is selected as the detection member 2.

The focusing unit 3 includes a focusing group frame 31, a focusing detection board 32, a focusing driving member 33, a screw rod 34, a screw nut 35, a plurality of guide rods 36 and a spring 37. The focusing group frame 31 is slidably installed on the base 1. The focusing detection board 32 formed on the focusing group frame 31 is corresponding to the detection member 2. The focusing driving member 33 installed on the base 1 is utilized to drive the focusing group frame 31 to move between a long-shot end and a close-shot end. The screw rod 34 is connected to the focusing driving member 33. The screw nut 35 disposed on the focusing group frame 31 is connec- tively screwed with the screw rod 34. The guide rods 36 fixed on the base 1 are penetratedly disposed on the focusing group frame 31. The spring 37 sleeved on one of the guide rods 36 includes two ends ejected between the base 1 and the focusing group frame 31. In this embodiment, the focusing unit 3 is a step motor.

The zooming unit 4 includes a zooming group frame 41, a zooming detection board 42, a zooming driving member 43, a reduction gear train 44, a cam cylinder 45 and a plunge cylinder 46. The zooming group frame 41 slidably installed on the base 1 is located above the focusing group frame 31 of the focusing unit 3. The zooming detection board 42 formed on the zooming group frame 41 is corresponding to the detection member 2. The zooming driving member 43 installed on the base 1 is utilized to drive the zooming group frame 41 to move between a wide-angle end and a telephoto end. The reduction gear train 44 is connected to the zooming driving member 43. The cam cylinder 45 is engaged to the reduction gear train 44. The plunge cylinder 46 is disposed on the base 1. The zooming driving member 43 is a motor. The cam cylinder 45 is concavely arranged with a plurality of cam guide grooves 451. The plunge cylinder 46 is opened with a plurality of plunge grooves 461. The zooming group frame 41 is provided with a plurality of pins 411 which pass through the plunge grooves 461 of the plunge cylinder 46 to embed in the cam guide grooves 451 of the cam cylinder 45.

It is worth to mention that the zooming group frame 41 and the plunge cylinder 46 are utilized to carry a second group zooming lens plate assembly 47. The zooming unit 4 further includes a first zooming group frame 481 and a first plunge cylinder 482, in which the first zooming group frame 481 is utilized to carry first group zooming lens plate assembly 480, and the first plunge cylinder 482 is disposed on the base 1. The cam cylinder 45 is further concavely arranged with a plurality of first cam guide grooves 452. The first plunge cylinder 482 is opened with a plurality of first plunge grooves 483. The first zooming group frame 481 is configured with a plurality of guide blocks 484 penetrated through the first plunge grooves 483 of the first plunge cylinder 482 and a plurality of first pins 485 embedded in the first cam guide grooves 452 of the cam cylinder 45.

Figure 10:
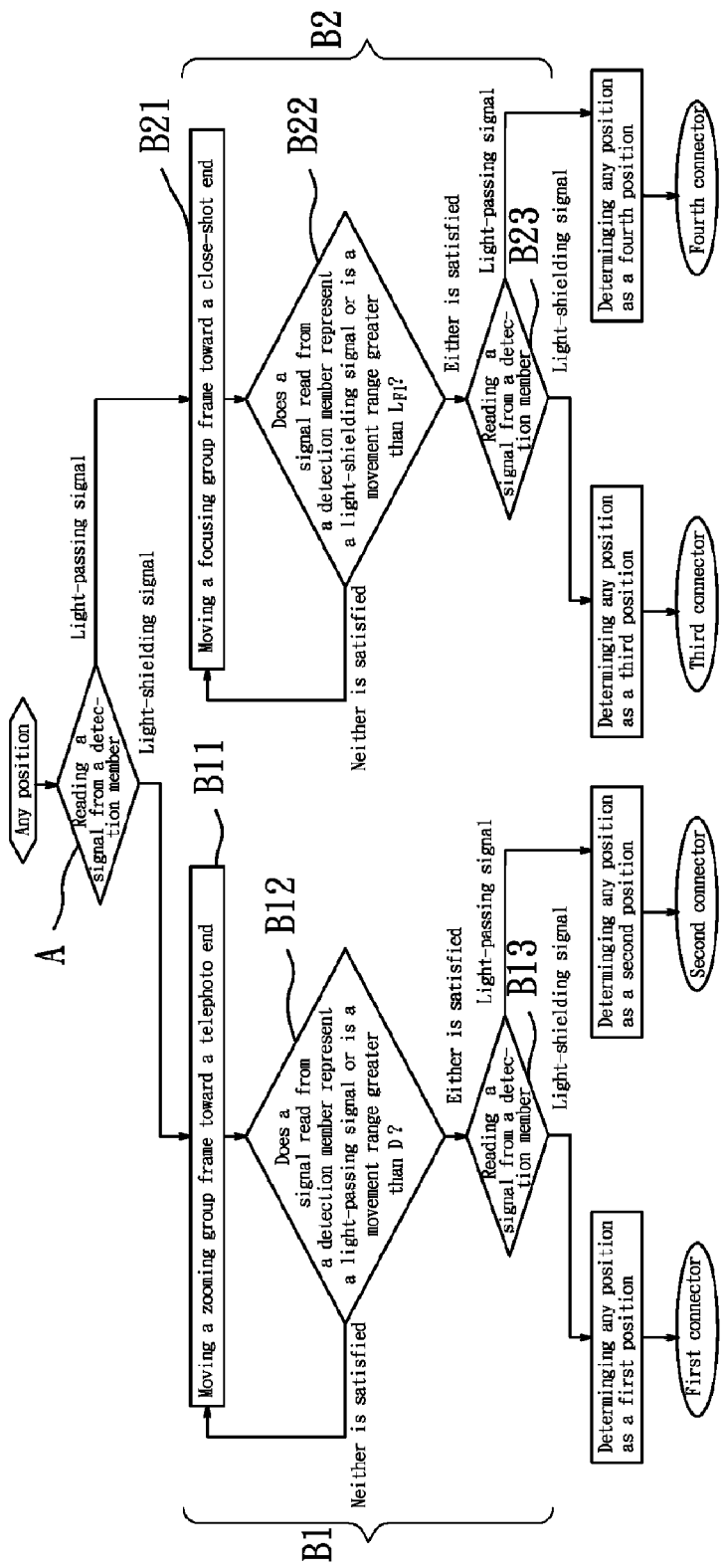
FIG. 10 is a flow chart illustrating a first preferred embodiment of a reset method for a lens with a single detection member shared to perform focusing and zooming operations of the invention.
Figure 11:
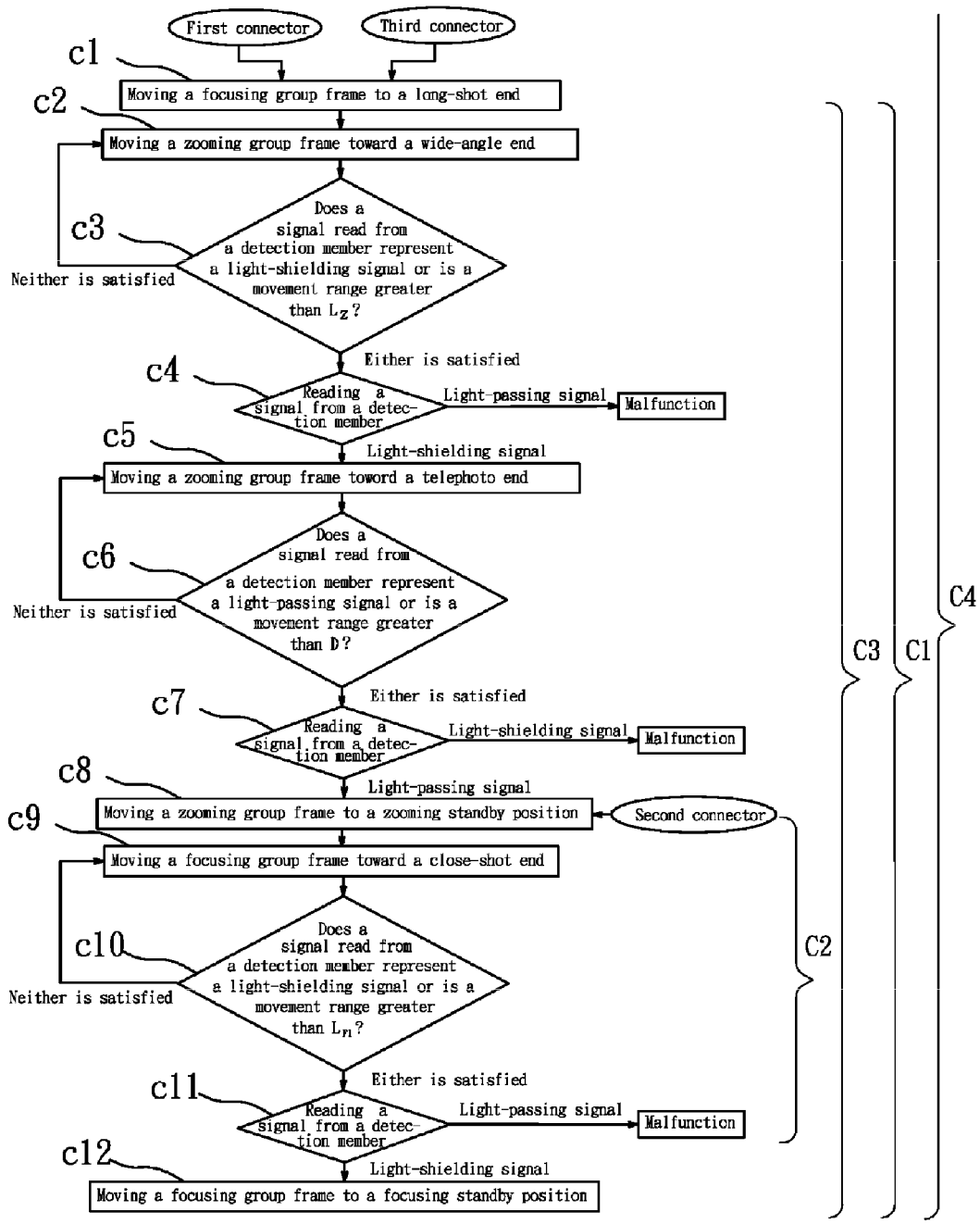
FIG. 11 is a flow chart continuing from FIG. 10, illustrating a process of the reset method of the first preferred embodiment.
Figure 12:
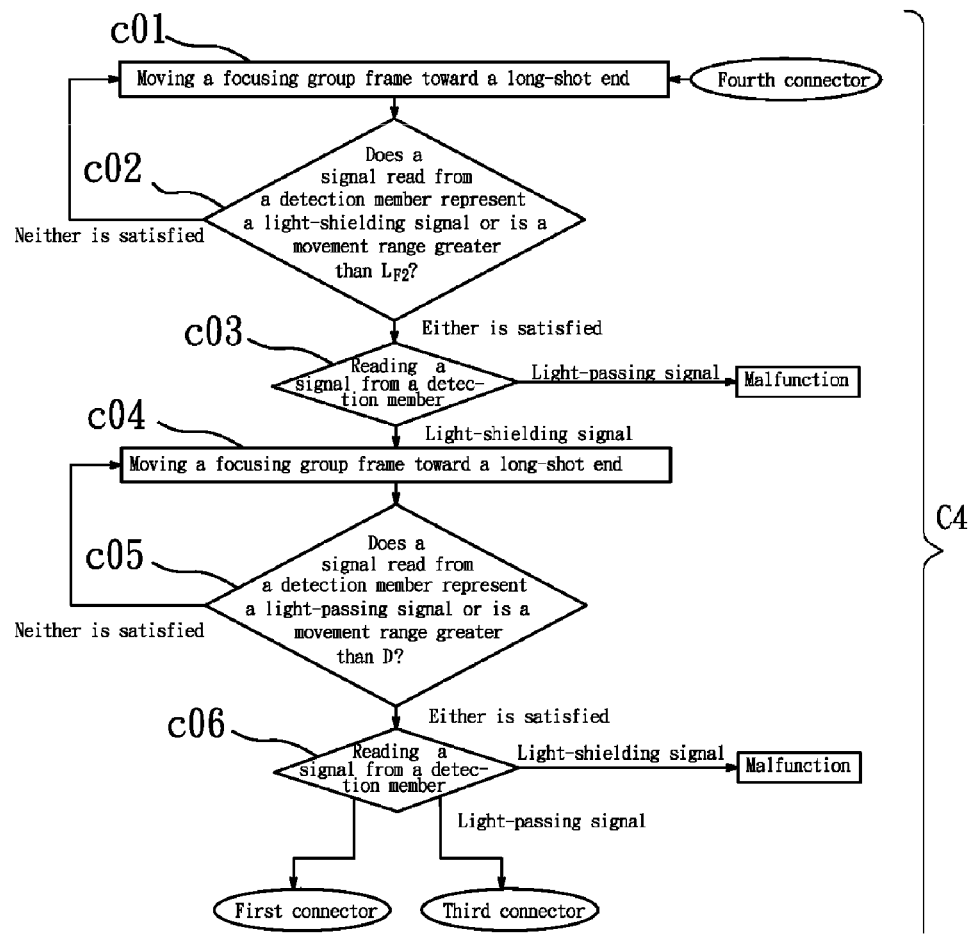
FIG. 12 is a flow chart continuing from between FIGS. 10 and 11, illustrating a process of the reset method of the first preferred embodiment.

Referring to FIGS. 10, 11 and 12, a reset method for the lens with the single detection member 2 shared to perform focusing and zooming operations includes the following steps.

Firstly, in an execution of a step 'A', the focusing group frame 31 of the focusing unit 3 and the zooming group frame 41 of the zooming unit 4 are in an any position where means a stop position of the focusing group frame 31 of the focusing unit 3 and the zooming group frame 41 of the zooming unit 4 when a picture-taking process is completed. A signal read from the detection member 2 is a light-passing signal or a light-shielding signal. Referring also to FIGS. 4, 5, 6 and 7, the any position of the focusing group frame 31 of the focusing unit 3 and the zooming group frame 41 of the zooming unit 4 can be a first position, a second position, a third position and a fourth position.

Figure 4:
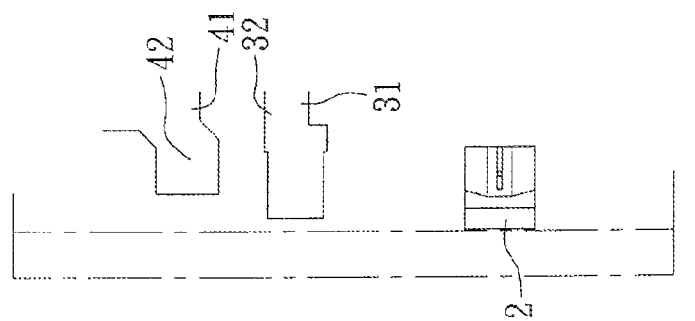
FIG. 4 is a schematic view illustrating that a focusing group frame and a zooming group frame of the first preferred embodiment are in a first position.
Figure 5:
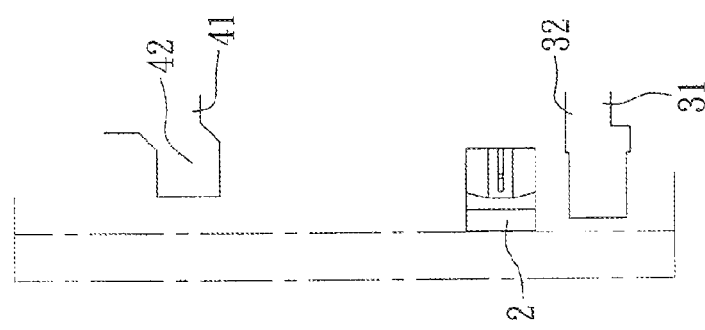
FIG. 5 is a schematic view illustrating that the focusing group frame and the zooming group frame of the first preferred embodiment are in a second position.
Figure 6:
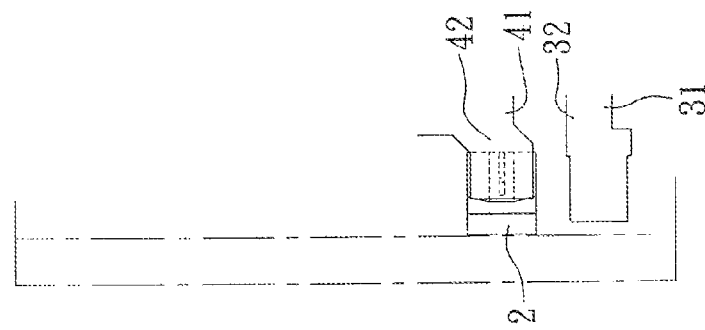
FIG. 6 is a schematic view illustrating that the focusing group frame and the zooming group frame of the first preferred embodiment are in a third position.
Figure 7:
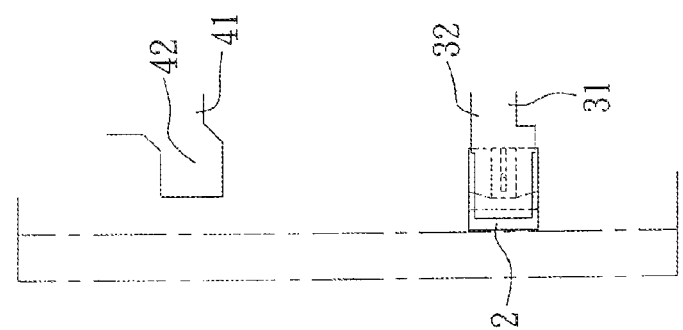
FIG. 7 is a schematic view illustrating that the focusing group frame and the zooming group frame of the first preferred embodiment are in a fourth position.

When the focusing group frame 31 of the focusing unit 3 and the zooming group frame 41 of the zooming unit 4 are in the first position where the signal of the detection member 2 represents the light-shielding signal, the focusing detection board 32 of the focusing unit 3 is located at the detection member 2 and the zooming detection board 42 of the zooming unit 4 is located above the focusing detection board 32 of the focusing unit 3 (as shown in FIG. 4). When the focusing group frame 31 of the focusing unit 3 and the zooming group frame 41 of the zooming unit 4 are in the second position where the signal of the detection member 2 represents the light-shielding signal, the zooming detection board 42 of the zooming unit 4 is located at the detection member 2 and the focusing detection board 32 of the focusing unit 3 is located below the zooming detection board 42 of the zooming unit 4 (as shown in FIG. 5). When the focusing group frame 31 of the focusing unit 3 and the zooming group frame 41 of the zooming unit 4 are in the third position where the signal of the detection member 2 represents the light-passing signal, the focusing detection board 32 of the focusing unit 3 is located below the detection member 2 and the zooming detection board 42 of the zooming unit 4 is located above the detection member 2 (as shown in FIG. 6). When the focusing group frame 31 of the focusing unit 3 and the zooming group frame 41 of the zooming unit 4 are in the fourth position where the signal of the detection member 2 represents the light-passing signal, the focusing detection board 32 of the focusing unit 3 and the zooming detection board 42 of the zooming unit 4 are located above the detection member 2 (as shown in FIG. 7).

Next, in an execution of a step 'B', with the focusing group frame 31 of the focusing unit 3 and the zooming group frame 41 of the zooming unit 4 which are driven in a predetermined step, the any position of the focusing group frame 31 of the focusing unit 3 and the zooming group frame 41 of the zooming unit 4 can be determined to be the first position, the second position, the third position or the fourth position, and the related contents will be described in detail hereinafter.

In an execution of a step 'C' after the step 'B', with the focusing driving member 33 and the zooming driving member 43, the focusing group frame 31 and the zooming group frame 41 are driven to reset as a predetermined standby position for the preparation of next picture-taking process.

Before the first position, the second position, the third position and the fourth position are described in detail, please refer to FIGS. 8 and 9. The range of the detection member 2 is defined as D, the range of the focusing group frame 31 which is measured from the long-shot end to the detection member 2 is defined as $L_{F1}$, the range of the focusing group frame 31 which is measured from the close-shot end to the detection member 2 is defined as $L_{F2}$, and the range of the zooming group frame 41 which is measured from the telephoto end to the detection member 2 is defined as $L_Z$. With the calculation of number of steps per rotation to the focusing driving member 33 and the zooming driving member 43, it can be known whether the movements of the focusing group frame 31 and the zooming group frame 41 are exceeded the ranges D, $L_{F1}$, $L_{F2}$, and $L_Z$ or not.

Referring to FIGS. 10 and 11, as in the step 'A' the signal read from the detection member 2 represents the light-shielding signal, the step 'B' is a step B1 including steps B11, B12 and B13. In the step B11, the zooming group frame 41 is moved toward the telephoto end. In the step B12, it is determined if the signal read from the detection member 2 represents the light-passing signal or a movement range of the zooming group frame 41 is greater than the range D of the detection member 2. The process is returned to the step B11 if neither is satisfied, and the step B13 is executed if either is satisfied. The first position is determined to be established if the signal read from the detection member 2 represents the light-shielding signal and the second position is determined to be established if the signal read from the detection member 2 represents the light-passing signal.

As the first position is determined by the step B13, the step 'C' is a step C1 including steps c1, c2, c3, c4, c5, c6, c7, c8, c9, c10, c11 and c12. In the step c1, the focusing group frame 31 is moved to the long-shot end. In the step c2 the zooming group frame 41 is moved toward the wide-angle end. In the step c3, it is determined if the signal read from the detection member 2 represents the light-shielding signal or a movement range of the zooming group frame 41 is greater than the range $L_Z$ measured from the telephoto end to the detection member 2. The process is returned to the step c2 if neither is satisfied, and the step c4 is executed if either is satisfied. In the step c4, the signal read from the detection member 2 is determined whether the signal represents the light-passing signal or the light-shielding signal, in which a malfunction is occurred if the signal represents the light-passing signal, and the step c5 is executed if the signal represents the light-shielding signal. In the step c5, the zooming group frame 41 is moved toward the telephoto end. In the step c6, it is determined if the signal read from the detection member 2 represents the light-passing signal or a movement range of the zooming group frame 41 is greater than the range D of the detection member 2. The process is returned to the step c5 if neither is satisfied, and the step c7 is executed if either is satisfied. In the step c7, the signal read from the detection member 2 is determined whether the signal represents the light-passing signal or the light-shielding signal, in which a malfunction is occurred if the signal represents the light-shielding signal, and the step c8 is executed if the signal represents the light-passing signal. In the step c8, the zooming group frame 41 is moved to a zooming standby position. In the step c9, the focusing group frame 31 is moved toward the close-shot end. In the step c10, it is determined if the signal read from the detection member 2 represents the light-shielding signal or a movement range of the focusing group frame 31 is greater than the range $L_{F1}$ measured from the long-shot end to the detection member 2. The process is returned to the step c9 if neither is satisfied, and the step c11 is executed if either is satisfied. In the step c11, the signal read from the detection member 2 is determined whether the signal represents the light-passing signal or the light-shielding signal, in which a malfunction is occurred if the signal represents the light-passing signal, and the step c12 is executed if the signal represents the light-shielding signal, so that the focusing group frame 31 is moved to a focusing standby position.

As the second position is determined by the step B13, the step 'C' is a step C2 including steps c8, c9, c10, c11 and c12. Finally, the focusing group frame 31 and the zooming group frame 41 are driven to reset as a predetermined standby position.

Referring to FIGS. 10, 11 and 12, as in the step 'A' the signal read from the detection member 2 represents the light-passing signal, the step 'B' is a step B2 including steps B21, B22 and B23. In the step B21, the focusing group frame 31 is moved toward the close-shot end. In the step B22, it is determined if the signal read from the detection member 2 represents the light-shielding signal or a movement range of the focusing group frame 31 is greater than the range $L_{F1}$ measured from the long-shot end to the detection member 2. The process is returned to the step B21 if neither is satisfied, and the step B23 is executed if either is satisfied. The third position is determined to be established if the signal read from the detection member 2 represents the light-shielding signal and the fourth position is determined to be established if the signal read from the detection member 2 represents the light-passing signal.

As the third position is determined by the step B23, the step 'C' is a step C3 which also includes steps c1, c2, c3, c4, c5, c6, c7, c8, c9, c10, c11 and c12. Finally, the focusing group frame 31 and the zooming group frame 41 are driven to reset as a predetermined standby position.

As the fourth position is determined by the step B23, the step 'C' is a step C4 including steps c01, c02, c03, c04, c05 and c06 and steps c1, c2, c3, c4, c5, c6, c7, c8, c9, c10, c11 and c12. In the step c01 the focusing group frame 31 is moved toward the long-shot end. In the step c02, it is determined if the signal read from the detection member 2 represents the light-shielding signal or a movement range of the focusing group frame 31 is greater than the range $L_{F2}$ measured from the close-shot end to the detection member 2. The process is returned to the step c01 if neither is satisfied, and the step c03 is executed if either is satisfied. In the step c03, the signal read from the detection member 2 is determined whether the signal represents the light-passing signal or the light-shielding signal, in which a malfunction is occurred if the signal represents the light-passing signal, and the step c04 is executed if the signal represents the light-shielding signal. In the step c04, the focusing group frame 31 is moved toward the long-shot end. In the step c05, it is determined if the signal read from the detection member 2 represents the light-passing signal or a movement range of the focusing group frame 31 is greater than the range D of the detection member 2. The process is returned to the step c04 if neither is satisfied, and the step c06 is executed if either is satisfied. In the step c06, the signal read from the detection member 2 is determined whether the signal represents the light-passing signal or the light-shielding signal, in which a malfunction is occurred if the signal represents the light-shielding signal, and the steps c1 to c12 are executed if the signal represents the light-passing signal. Finally, the focusing group frame 31 and the zooming group frame 41 are driven to reset as a predetermined standby position.

In conclusion, the focusing unit 3 is provided with the focusing detection board 32 and the zooming unit 4 is provided with the zooming detection board 42, which are based on the arrangement of the single detection member 2. With the above-described steps, the position determination and the reset as the predetermined standby position for the focusing group frame 31 and the zooming group frame 41 can be achieved, thereby certainly controlling the positions of the focusing group frame 31 and the zooming group frame 41 and reducing the manufacturing cost.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A lens with a single detection member shared to perform focusing and zooming operations, comprising:
    a base;
    a detection member installed on the base;
    a focusing unit comprising a focusing group frame slidably installed on the base, a focusing detection board formed on the focusing group frame and corresponding to the detection member, and a focusing driving member installed on the base and utilized to drive the focusing group frame to move between a long-shot end and a close-shot end; and
    a zooming unit comprising a zooming group frame slidably installed on the base and located above the focusing group frame of the focusing unit, a zooming detection board formed on the zooming group frame and corresponding to the detection member, and a zooming driving member installed on the base and utilized to drive the zooming group frame to move between a wide-angle end and a telephoto end;
    wherein the focusing driving member of the focusing unit is a motor, and the focusing unit further comprises a screw rod, a screw nut, a plurality of guide rods and a spring, in which the screw rod is connected to the focusing driving member, the screw nut is disposed on the focusing group frame and connectively screwed with the screw rod, the guide rods are fixed on the base and penetratedly disposed on the focusing group frame, and the spring sleeved on one of the guide rods includes two ends ejected between the base and the focusing group frame;
    wherein the zooming driving member of the zooming unit is a motor, and the zooming unit further comprises a reduction gear train, a cam cylinder concavely arranged with a plurality of cam guide grooves, and a plunge cylinder opened with a plurality of plunge grooves, in which the reduction gear train is connected to the zooming driving member, the cam cylinder is engaged to the reduction gear train, the plunge cylinder is disposed on the base, and the zooming group frame is provided with a plurality of pins which pass through the plunge grooves of the plunge cylinder to embed in the cam guide grooves of the cam cylinder.

2. A reset method for a lens with a single detection member shared to perform focusing and zooming operations, the lens comprising a base, a detection member installed on the base, a focusing unit and a zooming unit, in which the focusing unit comprises a focusing group frame slidably installed on the base, a focusing detection board formed on the focusing group frame and corresponding to the detection member, and a focusing driving member installed on the base and utilized to drive the focusing group frame to move between a long-shot end and a close-shot end; the zooming unit comprises a zooming group frame slidably installed on the base and located above the focusing group frame of the focusing unit, a zooming detection board formed on the zooming group frame and corresponding to the detection member, and a zooming driving member installed on the base and utilized to drive the zooming group frame to move between a wide-angle end and a telephoto end, the reset method comprising the steps of:
    (A) reading a signal from the detection member to determine whether the signal represents a light-passing signal or a light-shielding signal when the focusing group frame of the focusing unit and the zooming group frame of the zooming unit are in an any position, in which the focusing detection board of the focusing unit is located at the detection member and the zooming detection board of the zooming unit is located above the focusing detection board of the focusing unit when the focusing group frame of the focusing unit and the zooming group frame of the zooming unit are in a first position where the signal of the detection member represents the light-shielding signal; the zooming detection board of the zooming unit is located at the detection member and the focusing detection board of the focusing unit is located below the zooming detection board of the zooming unit when the focusing group frame of the focusing unit and the zooming group frame of the zooming unit are in a second position where the signal of the detection member represents the light-shielding signal; the focusing detection board of the focusing unit is located below the detection member and the zooming detection board of the zooming unit is located above the detection member when the focusing group frame of the focusing unit and the zooming group frame of the zooming unit are in a third position where the signal of the detection member represents the light-passing signal; and the focusing detection board of the focusing unit and the zooming detection board of the zooming unit are located above the detection member when the focusing group frame of the focusing unit and the zooming group frame of the zooming unit are in a fourth position where the signal of the detection member represents the light-passing signal;

(B) determining the any position of the focusing group frame of the focusing unit and the zooming group frame of the zooming unit is in the first position, the second position, the third position or the fourth position; and (C) driving the focusing group frame and the zooming group frame by the focusing driving member and the zooming driving member to reset as a predetermined standby position.

3. The reset method for the lens with the single detection member shared to perform focusing and zooming operations as claimed in claim 2, wherein the step (B) is a step (B1) comprising steps (B11), (B12) and (B13) as in the step (A) the signal read from the detection member represents the light-shielding signal, in which in the step (B11) the zooming group frame is moved toward the telephoto end; in the step (B12), whether the signal read from the detection member represents the light-passing signal or a movement range of the zooming group frame is greater than a range of the detection member is determined; the step (B11) is executed if neither the signal read from the detection member represents the light-passing signal nor the movement range of the zooming group frame is greater than the range of the detection member; and the step (B13) is executed if either the signal read from the detection member represents the light-passing signal or the movement range of the zooming group frame is greater than the range of the detection member, and the first position is determined to be established if the signal read from the detection member represents the light-shielding signal and the second position is determined to be established if the signal read from the detection member represents the light-passing signal.

4. The reset method for the lens with the single detection member shared to perform focusing and zooming operations as claimed in claim 3, wherein the step (C) is a step (C1) comprising steps (c1), (c2), (c3), (c4), (c5), (c6), (c7), (c8), (c9), (c10), (c11) and (c12) as the first position determined by the step (B13) is established, in which in the step (c1) the focusing group frame is moved to the long-shot end; in the step (c2) the zooming group frame is moved toward the wide-angle end; in the step (c3), whether the signal read from the detection member represents the light-shielding signal or a movement range of the zooming group frame is greater than a range measured from the telephoto end to the detection member is determined; the step (c2) is executed if neither the signal read from the detection member represents the light-shielding signal nor the movement range of the zooming group frame is greater than the range measured from the telephoto end to the detection member, and the step (c4) is executed if either the signal read from the detection member represents the light-shielding signal or the movement range of the zooming group frame is greater than the range measured from the telephoto end to the detection member; in the step (c4), the signal read from the detection member is determined whether the signal represents the light-passing signal or the light-shielding signal, a malfunction is occurred if the signal represents the light-passing signal, and the step (c5) is executed if the signal represents the light-shielding signal; in the step (c5), the zooming group frame is moved toward the telephoto end; in the step (c6), whether the signal read from the detection member represents the light-passing signal or a movement range of the zooming group frame is greater than a range of the detection member is determined, and the step (c5) is executed if neither the signal read from the detection member represents the light-passing signal nor the movement range of the zooming group frame is greater than the range of the detection member, and the step (c7) is executed if either the signal read from the detection member represents the light-passing signal or the movement range of the zooming group frame is greater than the range of the detection member; in the step (c7), the signal read from the detection member is determined whether the signal represents the light-passing signal or the light-shielding signal, a malfunction is occurred if the signal represents the light-shielding signal, and the step (c8) is executed if the signal represents the light-passing signal; in the step (c8), the zooming group frame is moved to a zooming standby position; in the step (c9), the focusing group frame is moved toward the close-shot end; in the step (c10), whether the signal read from the detection member represents the light-shielding signal or a movement range of the focusing group frame is greater than a range measured from the long-shot end to the detection member is determined, and the step (c9) is executed if neither the signal read from the detection member represents the light-shielding signal nor the movement range of the focusing group frame is greater than the range measured from the long-shot end to the detection member, and the step (c11) is executed if either the signal read from the detection member represents the light-shielding signal or the movement range of the focusing group frame is greater than the range measured from the long-shot end to the detection member; and in the step (c11), the signal read from the detection member is determined whether the signal represents the light-passing signal or the light-shielding signal, a malfunction is occurred if the signal represents the light-passing signal, and the step (c12) is executed if the signal represents the light-shielding signal, so that the focusing group frame is moved to a focusing standby position.

5. The reset method for the lens with the single detection member shared to perform focusing and zooming operations as claimed in claim 3, wherein the step (C) is a step (C2) comprising steps (c8), (c9), (c10), (c11) and (c12) as the second position determined by the step (B13) is established, in which in the step (c8) the zooming group frame is moved to a zooming standby position; in the step (c9), the focusing group frame is moved toward the close-shot end; in the step (c10), whether the signal read from the detection member represents the light-shielding signal or a movement range of the focusing group frame is greater than a range measured from the long-shot end to the detection member is determined, and the step (c9) is executed if neither the signal read from the detection member represents the light-shielding signal nor the movement range of the focusing group frame is greater than the range measured from the long-shot end to the detection member, and the step (c11) is executed if either the signal read from the detection member represents the light-shielding signal or the movement range of the focusing group frame is greater than the range measured from the long-shot end to the detection member; and in the step (c11), the signal read from the detection member is determined whether the signal represents the light-passing signal or the light-shielding signal, a malfunction is occurred if the signal represents the light-passing signal, and the step (c12) is executed if the signal represents the light-shielding signal, so that the focusing group frame is moved to a focusing standby position.

6. The reset method for the lens with the single detection member shared to perform focusing and zooming operations as claimed in claim 2, wherein the step (B) is a step (B2) comprising steps (B21), (B22) and (B23) as in the step (A) the signal read from the detection member represents the light-passing signal, in which in the step (B21) the focusing group frame is moved toward the close-shot end; in the step (B22), whether the signal read from the detection member represents the light-shielding signal or a movement range of the focusing group frame is greater than a range measured from the long-shot end to the detection member is determined, and the step (B21) is executed if neither the signal read from the detection member represents the light-shielding signal nor the movement range of the focusing group frame is greater than the range measured from the long-shot end to the detection member; and the step (B23) is executed if either the signal read from the detection member represents the light-shielding signal or the movement range of the focusing group frame is greater than the range measured from the long-shot end to the detection member, and the third position is determined to be established if the signal read from the detection member represents the light-shielding signal and the fourth position is determined to be established if the signal read from the detection member represents the light-passing signal.

7. The lens with the single detection member shared to perform focusing and zooming operations as claimed in claim 6, wherein the step (C) is a step (C3) comprising steps (c1), (c2), (c3), (c4), (c5), (c6), (c7), (c8), (c9), (c10), (c1) and (c12) as the third position determined by the step (B23) is established, in which in the step (c1) the focusing group frame is moved to the long-shot end; in the step (c2) the zooming group frame is moved toward the wide-angle end; in the step (c3), whether the signal read from the detection member represents the light-shielding signal or a movement range of the zooming group frame is greater than a range measured from the telephoto end to the detection member is determined, the step (c2) is executed if neither the signal read from the detection member represents the light-shielding signal nor the movement range of the zooming group frame is greater than the range measured from the telephoto end to the detection member, and the step (c4) is executed if either the signal read from the detection member represents the light-shielding signal or the movement range of the zooming group frame is greater than the range measured from the telephoto end to the detection member; in the step (c4), the signal read from the detection member is determined whether the signal represents the light-passing signal or the light-shielding signal, a malfunction is occurred if the signal represents the light-passing signal, and the step (c5) is executed if the signal represents the light-shielding signal; in the step (c5), the zooming group frame is moved toward the telephoto end; in the step (c6), whether the signal read from the detection member represents the light-passing signal or a movement range of the zooming group frame is greater than a range of the detection member is determined, the step (c5) is executed if neither the signal read from the detection member represents the light-passing signal nor the movement range of the zooming group frame is greater than the range of the detection member, and the step (c7) is executed if either the signal read from the detection member represents the light-passing signal or the movement range of the zooming group frame is greater than the range of the detection member; in the step (c7), the signal read from the detection member is determined whether the signal represents the light-passing signal or the light-shielding signal, a malfunction is occurred if the signal represents the light-shielding signal, and the step (c8) is executed if the signal represents the light-passing signal; in the step (c8), the zooming group frame is moved to a zooming standby position; in the step (c9), the focusing group frame is moved toward the close-shot end; in the step (c10), whether the signal read from the detection member represents the light-shielding signal or a movement range of the focusing group frame is greater than a range measured from the long-shot end to the detection member is determined, the step (c9) is executed if neither the signal read from the detection member represents the light-shielding signal nor the movement range of the focusing group frame is greater than the range measured from the long-shot end to the detection member, and the step (c11) is executed if either the signal read from the detection member represents the light-shielding signal or the movement range of the focusing group frame is greater than the range measured from the long-shot end to the detection member; and in the step (c11), the signal read from the detection member is determined whether the signal represents the light-passing signal or the light-shielding signal, a malfunction is occurred if the signal represents the light-passing signal, and the step (c12) is executed if the signal represents the light-shielding signal, so that the focusing group frame is moved to a focusing standby position.

8. The lens with the single detection member shared to perform focusing and zooming operations as claimed in claim 6, wherein the step (C) is a step (C4) comprising steps (c01), (c02), (c03), (c04), (c05) and (c06) and steps (c1), (c2), (c3), (c4), (c5), (c6), (c7), (c8), (c9), (c10), (c11) and (c12) as the fourth position determined by the step (B23) is established, in which in the step (c01) the focusing group frame is moved toward the long-shot end; in the step (c02), whether the signal read from the detection member represents the light-shielding signal or a movement range of the focusing group frame is greater than a range measured from the close-shot end to the detection member is determined, the step (c01) is executed if neither the signal read from the detection member represents the light-shielding signal nor the movement range of the focusing group frame is greater than the range measured from the close-shot end to the detection member, and the step (c03) is executed if either the signal read from the detection member represents the light-shielding signal or the movement range of the focusing group frame is greater than the range measured from the close-shot end to the detection member; in the step (c03), the signal read from the detection member is determined whether the signal represents the light-passing signal or the light-shielding signal, a malfunction is occurred if the signal represents the light-passing signal, and the step (c04) is executed if the signal represents the light-shielding signal; in the step (c04), the focusing group frame is moved toward the telephoto end; in the step (c05), whether the signal read from the detection member represents the light-passing signal or a movement range of the focusing group frame is greater than a range of the detection member is determined, the step (c04) is executed if neither the signal read from the detection member represents the light-passing signal nor the movement range of the focusing group frame is greater than the range of the detection member, and the step (c06) is executed if either the signal read from the detection member represents the light-passing signal or the movement range of the focusing group frame is greater than the range of the detection member; in the step (c06), the signal read from the detection member is determined whether the signal represents the light-passing signal or the light-shielding signal, a malfunction is occurred if the signal represents the light-shielding signal, and the step (c1) is executed if the signal represents the light-passing signal; in the step (c1), the focusing group frame is moved to the long-shot end; in the step (c2) the zooming group frame is moved toward the wide-angle end; in the step (c3), whether the signal read from the detection member represents the light-shielding signal or a movement range of the zooming group frame is greater than a range measured from the telephoto end to the detection member is determined, the step (c2) is executed if neither the signal read from the detection member represents the light-shielding signal nor the movement range of the zooming group frame is greater than the range measured from the telephoto end to the detection member, and the step (c4) is executed if either the signal read from the detection member represents the light-shielding signal or the movement range of the zooming group frame is greater than the range measured from the telephoto end to the detection member; in the step (c4), the signal read from the detection member is determined whether the signal represents the light-passing signal or the light-shielding signal, a malfunction is occurred if the signal represents the light-passing signal, and the step (c5) is executed if the signal represents the light-shielding signal; in the step (c5), the zooming group frame is moved toward the telephoto end; in the step (c6), whether the signal read from the detection member represents the light-passing signal or a movement range of the zooming group frame is greater than a range of the detection member is determined, the step (c5) is executed if neither the signal read from the detection member represents the light-passing signal nor the movement range of the zooming group frame is greater than the range of the detection member, and the step (c7) is executed if either the signal read from the detection member represents the light-passing signal or the movement range of the zooming group frame is greater than the range of the detection member; in the step (c7), the signal read from the detection member is determined whether the signal represents the light-passing signal or the light-shielding signal, a malfunction is occurred if the signal represents the light-shielding signal, and the step (c8) is executed if the signal represents the light-passing signal; in the step (c8), the zooming group frame is moved to a zooming standby position; in the step (c9), the focusing group frame is moved toward the close-shot end; in the step (c10), whether the signal read from the detection member represents the light-shielding signal or a movement range of the focusing group frame is greater than a range measured from the long-shot end to the detection member is determined, the step (c9) is executed if neither the signal read from the detection member represents the light-shielding signal nor the movement range of the focusing group frame is greater than the range measured from the long-shot end to the detection member, and the step (c11) is executed if either the signal read from the detection member represents the light-shielding signal or the movement range of the focusing group frame is greater than the range measured from the long-shot end to the detection member; and in the step (c11), the signal read from the detection member is determined whether the signal represents the light-passing signal or the light-shielding signal, a malfunction is occurred if the signal represents the light-passing signal, and the step (c12) is executed if the signal represents the light-shielding signal, so that the focusing group frame is moved to a focusing standby position.

* * * * *